2,890,096
Patented June 9, 1959

2,890,096

TANNING PROCESS FOR HIDES AND FURS

Rudi Heyden, Dusseldorf, Jürgen Plapper, Dusseldorf-Holthausen, and Friedrich Schmitt, Dusseldorf, Germany, assignors to Bohme Fettchemie G.m.b.H., Dusseldorf, Germany No Drawing. Application August 4, 1953
Serial No. 372,380

Claims priority, application Germany August 11, 1952

2 Claims. (Cl. 8—94.24)

The present invention relates to the preparation of water-soluble resinous condensation products and a tanning process using the same.

The condensation of aliphatic or aromatic sulfonamides with formaldehyde leads, depending on the method of preparation, either to simple water-soluble N-methylol compounds, or to water-insoluble comparatively low molecular products which are probably derivatives of triazine.

It has now been found that technically valuable water-soluble products of resinous character may be obtained by condensing organic sulfonamides with formaldehyde and using at the same time condensible amido compounds containing at least one amino group linked directly to a CO—, CS—, C(NH)— or CN-group and having at least one exchangeable hydrogen atom.

The mixed polymers thus obtained are water-soluble products which can easily be converted into stable dry form by evaporating in vacuo or by spraying, and which are characterized by the fact that they may be converted into water-insoluble resinous condensation products by the action of an electrolyte, such as an acid or a salt, more particularly an ammonium salt, or by heating.

One of the starting materials for making the resinous condensation products are mono- or polysulfonamides of the unsubstituted or alkyl substituted aromatic series. Sulfonamides to be used are for instance benzene sulfonamide, naphthalenemono- and polysulfonamides, p- and o- toluenesulfonamide, higher molecular alkylbenzene sulfonamides, (alkyl radicals $C_2$–$C_{12}$ and higher). These sulfonamides are condensed with formaldehyde and a condensable amido compound containing at least one amino group linked to a CO—, CS—, C(NH)— or CN group and having at least one exchangeable hydrogen atom; such compounds are urea, thiourea, alkylurea, methylene di-urea, urethane, guanidine, alkylguanidines, cyanamide, dicyandiamide, dicyandiamidine; furthermore, cyclic compounds, such as methyldiaminotriazine, triaminotriazine (melamine), melam, melem, mellon, ammelin and the like.

The ratios in which the above-named starting materials are reacted may vary. It is possible to operate in a ratio 1:1, but either the sulfonamide components or the amido components may be used in excess. Formaldehyde may be used in calculated quantities, but as a rule, it is used in an excess of 4–15 mols or more. In general, the water-solubility of the condensation products increases with the amount of formaldehyde used and the properties of the condensation products may be adapted to the purpose for which they are used by change of the ratios applied.

For preparing the condensation products according to the invention, the starting materials are dissolved or suspended in aqueous media and heated over a certain length of time until formation of a water-soluble resinous condensation product has occurred; temperatures are about 60–100° C., but in some cases higher temperatures and pressure, may be applied. The conventional condensing agents, for instance borax, may be used. If desired, precondensates may be made from the organic sulfonamides or amido compounds with formaldehyde and the precondensates will then be further condensed with the third component. After the condensation is terminated, the solutions may be evaporated or sprayed so as to isolate the obtained condensed product.

In the following, preparation of the condensation product will be described in a number of examples.

The parts are by weight except where otherwise noted:

*Example 1*

32.2 parts of a mixture of p- and o-toluenesulfamide are mixed with 67.2 parts dicyandiamide and 500 parts by volume of 30% formaldehyde solution. After having added 1.3 parts borax, the mixture is refluxed for six hours, whereupon the solution is evaporated in vacuo. A colorless resin, easily soluble in water, is thereby obtained.

*Example 2*

86 parts p-toluene sulfamide are mixed with 120 parts of urea and 1250 parts by volume of a 30% formaldehyde solution to which 13 parts of borax are added, whereupon refluxing is carried out for 2½ hours.

Samples taken in intervals during the reaction first render turbid upon dilution with water, later they become clearly soluble in water. The clearly water-soluble condensation product is sprayed at a temperature of about 100–120° C. The product obtained is a colorless resin, clearly soluble in water.

The condensation products made according to the present invention are light-colored water-soluble products which are furthermore very suitable as tanning agents and permit to obtain lasting tanning effects. These may still be improved if the resin tannage is combined with an oil tannage, i.e. with a tanning process in which substances containing aliphatic residues are used.

The amounts of the water-soluble, resinous condensation product to be used in tanning depends essentially on the type of furs or skins to be tanned, on the pretreatment of the hides or furs, and on the kind of leather to be obtained. In general, the amount of tanning agent lies between 2 and 10%, preferably between 2 and 6%, calculated on the weight of the hide. The pre-treatment of the hides and furs is conventional. The skins are prepared by soaking in the beam house, painting, liming, deliming, bating and, if necessary, by pickling.

The subsequent conversion of the soluble condensates into insoluble form can be effected in different ways. Preferably, acid treatment, for instance with formic acid, or low molecular first run acid mixtures, such as are obtained in the oxidation of paraffin, is applied.

Another way of making the resins insoluble is the addition of salts, for instance ammonium salts, such as ammonium chloride. In some cases, an acid action may be obtained by pickling the skins (pH 3 to 4), and in such cases a conversion of the resinous condensation product into insoluble form will occur during impregnation. Finally, a heat-treatment will cause the conversion.

The leathers obtained according to this process, or the tanned furs respectively, are distinguished by light color or by pure white color, and good fullness.

The tanning effect obtained may further be improved by combining the resin tannage with an oil tannage, as mentioned above. This will lead to still softer and fuller leathers and furs, which also have an excellent tear-resistance. The tanning effect obtained is also distinguished by the fact that it will be resistant to washing.

Starting materials for oil tanning are compounds of different kinds which contain aliphatic residues. Those used primarily are water-soluble salts of alkyl sulfates with organic or inorganic bases, water-soluble salts of alkyl or alkylaryl sulfonic acids, or of sulfonated oils or fats.

Apart from these products, which have a predominantly surface-active character, we may use in the present process as components containing aliphatic radicals other substances containing fatty or oily residues, such as animal or vegetable fatty acids, for instance olein, animal or vegetable oils or fats, e.g. train oil, tall oil, resin oil and the like.

If the present resin tannage is combined with an oil tanning, the process is carried out by incorporating into the skins or furs the resin and the oil tanning components, either subsequently in any desired order or, in some cases, simultaneously.

The amounts of the oil tannage component lie between 1% and 10%, preferably between 2%–5%. The oil tanning components may be used in aqueous solution or emulsion, the resinous components in aqueous solution or colloidal dispersion.

The process according to the invention may be used for the manufacture of different kinds of leather from animal hides or split hides, such as deer, roe, lamb, sheep, kid, goat, calf, pig, or cow hides and other hides of large animals. The process is, furthermore, most valuable for tanning furs, such as foal, lamb, rabbit, and more valuable furs, and for the tanning of reptile skins. The leathers obtained may be used for gloves, wearing apparel, shoe uppers, chamois, and leather for technical purposes.

In the following the tanning process according to the invention will be more fully described in a number of examples.

Percentages mentioned in these examples are calculated with reference to the weights of the hides.

*Example 3*

A bated calf's hide with a pH value of about 7 is drummed for 1 to 3 hours with 10% of the copolymer obtained according to Example 1 and 80–100 percent water; during the next two hours, the solution is acidified to a pH 4.5 by careful addition of formic acid in intervals of one-half hour. The total amount necessary is 0.5 percent of an 85% formic acid. The hides remain in the drum for another two or three hours, are then removed and placed on the horse for 24 to 48 hours, neutralized and lickered. A soft white leather of high tear-resistance is thereby obtained.

*Example 4*

A bated calf's hide having a pH of about 7 is drummed for about 2 hours with 3% of the copolymer obtained according to Example 1 and 80 to 100% water, thereupon acidified to a pH of 4.5 with about 0.65% of formic acid in intervals during ½–¾ of an hour. After 2 to 3 more hours of drumming, the hides are taken out, left overnight on the horse, and milled for 1 to 3 hours the next day with 60% water and 5% of a paste containing 50% of ocenolsodiumsulfate, and finally mixed with 2% potassium alum dissolved in water at a ratio of 1:10. Addition of the alum takes place gradually. After a further drumming of 1 to 2 hours, the hides are taken out, dried and staked. A soft white leather with full, pleasant touch is thereby obtained.

*Example 5*

A bated calf's hide with a pH value of about 7 is drummed for 2 hours with 3% of the copolymer obtained according to Example 1 and 100% water and thereafter acidified to a pH of 4.5 with 0.5% of 85% formic acid within ¾ of an hour; it is then drummed for another hour. Without changing the tanning liquor, we add 1.5% chromium oxide (in form of a 33% basic chrome tanning agent). The addition is made in two batches within an hour. The chrome tanning is carried out as usual and the leather is afterwards placed on the horse for 24 hours. It is then finished in the conventional way. Dye and oil absorption are satisfactory. The leathers obtained are very full and close-grained.

*Example 6.—Preparation of leather lining and fine leather*

After deliming and bating, the hides are rinsed and preliminarily tanned with

80–100% water
0.8–1.5% of a water-soluble precondensate of o- and p-toluenesulfamide, dicyandiamide and formaldehyde 1:10, at a temperature of 50–60° C. and, if desired, with addition of
2% of a licker oil emulsified with a cation soap.

Drumming time: 3 hours.

The pre-tanned leather remains in the drum overnight, is again drummed for 1 hour the next day and thereafter adjusted to a pH of 4.6 with organic acid or an organic acid mixture. The leathers are placed on the horse for 2 days and are rinsed 5 minutes before being after-treated with vegetable/synthetic tanning agents.

After-tanning:
    80 to 100% water of normal temperature,
    10% pure tanning agent comprising:
        20 parts quebracho
        40 parts mimosa, and
        40 parts of a synthetic tanning agent as it is conventionally used for the preparation of leather lining.

Tanning time: 1½ to 3 hours.

The leathers have a light-colored, even appearance, a full touch and high tear-resistance. The latter is particularly satisfactory if a cationic greasing agent is added simultaneously with the resin tannage.

*Example 7.—Manufacture of vachette leathers*

Pretanning:
    80 to 120% water of normal temperature
    1–2% of a precondensate of p-toluene sulfamide, urea, and formaldehyde, dissolved 1:10, at 50–60° C. and, if desired, with addition of
    2–3% of a mineral oil emulsion, emulsified by a cationic soap.

Tanning time: 1 to 1½ days.

After the tanning, the leathers are adjusted to a pH of 4.4 to 4.6 by means of organic acids, if necessary.

Subsequently, they are rinsed, but it is preferable to have the leather piled for 1 to 2 days before the rinsing.

After-tanning:
    80 to 100% water of normal temperature,
    10–15% pure tanning agent, consisting of:
        20 parts valonia
        40 parts mimosa, and
        40 parts of a synthetic tanning agent as it is conventionally used for vachette tanning.

Tanning time: 2 to 3 days.

After storage for 1 to 3 days, the leathers are rinsed. Finishing and greasing steps are as usual. The amount of the greasing agent can be cut down to half the usual amount, if, during the resin tannage, some oily substance has been added.

*Example 8.—Manufacture of bottom leather*

The hides are delimed as usual and bathed if desired.

They should be free of lime in the outer layer; the inner layer of about 50–70% of the total cross section of the skin need not be freed from lime.

Pretannage:
  100% liquor calculated on the weight of the hide,
  0.1% of a precondensate of p-toluene sulfamide, dicyandiamide, and formaldehyde calculated on the amount of liquor, or 1% of the same resin condensate calculated on the weight of the hide—
  pH of the liquor, 7–7.5.

Tanning time: 1½ to 2 days: Adjust the leather to a pH of 4.2 (outer layer) and 5.2 inner layer. Pile for 1 day and rinse subsequently.

After-tanning: After-tannage is carried out in the pit by hanging the pretanned leather into a synthetic/vegetable tanning liquor of 8 to 12° Bé. The leathers are tanned through after 3 to 5 weeks. The tanning time depends on the thickness of the skins. End-Bé. 9.5°, when the starting liquor has a Bé. of 11°. Pile leathers for ½ to 1 day. Rinse shortly, dry, and oil if necessary.

The leather is well and evenly tanned through with a comparatively short tanning time, has a fatty appearance in the cut and a light-colored surface, free of overlying tanning agent.

What we claim is:

1. A process for tanning hides and furs which comprises applying thereto as a tanning agent a water-soluble resinous condensation product obtained by condensing an organic sulfonamide selected from the group of compounds consisting of unsubstituted and alkyl substituted monosulfonamides and polysulfonamides of aromatic hydrocarbons with formaldehyde and with dicyandiamide, converting the said water-soluble resinous condensates into insoluble form and finishing the tanned materials in the usual manner.

2. A process according to claim 1, wherein the resin tannage is combined with an oil tannage using as oil tanning agent a water compatible salt of a compound selected from the group of alkyl sulfates, alkyl sulfonates, alkyl aryl sulfonates, and of sulfonated oils and fats.

References Cited in the file of this patent

UNITED STATES PATENTS

| | | |
|---|---|---|
| 2,191,943 | Russell | Feb. 27, 1940 |
| 2,317,184 | Dreyfuss | Apr. 20, 1943 |
| 2,331,376 | D'alelio | Oct. 12, 1943 |
| 2,338,637 | Gundel | Jan. 4, 1944 |
| 2,344,321 | Orthner | Mar. 14, 1944 |
| 2,365,599 | Schirm | Dec. 19, 1944 |
| 2,637,622 | Dawson et al. | May 5, 1953 |

FOREIGN PATENTS

| | | |
|---|---|---|
| 90,872 | Switzerland | Oct. 1, 1921 |